(12) United States Patent
Rasmussen et al.

(10) Patent No.: US 9,010,473 B1
(45) Date of Patent: Apr. 21, 2015

(54) MOTORIZED RETRACTABLE STEP APPARATUS

(71) Applicant: Lippert Components, Inc., Goshen, IN (US)

(72) Inventors: Aaron Rasmussen, Fruit Heights, UT (US); Chad Johnson, Kaysville, UT (US); Stephen W. Jenkins, Union, MI (US)

(73) Assignee: Lippert Components, Inc., Elkhart, IN (US)

( * ) Notice: Subject to any disclaimer, the term of this patent is extended or adjusted under 35 U.S.C. 154(b) by 15 days.

(21) Appl. No.: 14/045,659

(22) Filed: Oct. 3, 2013

(51) Int. Cl.
*B62B 9/22* (2006.01)
*B60R 3/02* (2006.01)

(52) U.S. Cl.
CPC ........................................ *B60R 3/02* (2013.01)

(58) Field of Classification Search
USPC ................................................. 280/163–169
See application file for complete search history.

(56) References Cited

U.S. PATENT DOCUMENTS

| | | | |
|---|---|---|---|
| 4,116,457 A | 9/1978 | Nerem et al. | |
| 4,134,504 A | 1/1979 | Salas et al. | |
| 4,623,160 A | 11/1986 | Trudell | |
| 4,669,574 A | 6/1987 | Moutot | |
| 4,690,606 A | 9/1987 | Ross | |
| 5,425,615 A | 6/1995 | Hall et al. | |
| 5,547,040 A | 8/1996 | Hanser et al. | |
| 5,772,274 A | 6/1998 | Tokarz | |
| 5,957,237 A | 9/1999 | Tigner | |
| 6,983,979 B2 | 1/2006 | Rasmussen | |
| 7,163,221 B2 | 1/2007 | Leitner | |
| 7,607,674 B2 * | 10/2009 | Watson | 280/166 |
| 7,677,584 B2 | 3/2010 | Raley et al. | |
| 7,857,337 B2 * | 12/2010 | Ferguson et al. | 280/166 |
| 8,038,193 B2 | 10/2011 | Rasmussen | |
| 8,251,178 B2 | 8/2012 | Krobot | |
| 8,474,899 B2 | 7/2013 | Moran et al. | |
| 2003/0047388 A1 | 3/2003 | Faitel | |
| 2003/0071434 A1 | 4/2003 | Budd | |
| 2007/0199258 A1 | 8/2007 | Reeves | |
| 2008/0135334 A1 | 6/2008 | Graham | |
| 2011/0280700 A1 | 11/2011 | Uttech et al. | |

OTHER PUBLICATIONS

Kwikee Owner's Manual #888, Electric Steps, May 2012 (12 pp.).
Kwikee Owner's Manual, Revolution Series Electric Steps, Sep. 2009 (4 pp.).
Kwikee Owner's Manual #890, Electric Steps, Jan. 2009 (12 pp.).
Kwikee Owner's Manual #3000, Platinum Series Electric Steps, Sep. 2008 (4 pp.).
Kwikee Owner's Manual 47 Series Step, May 2007 (8 pp.).

(Continued)

*Primary Examiner* — John Walters
*Assistant Examiner* — James Triggs
(74) *Attorney, Agent, or Firm* — Holland & Hart LLP

(57) ABSTRACT

A motorized retractable step apparatus includes one or more steps that move between a retracted position and a deployed position. The step apparatus includes a drive member that spans the length of the step apparatus and rotates to retract or deploy the steps. The step apparatus uses a direct drive configuration to transfer power from an electric motor to the drive member. The step apparatus can also includes a brake coupled to the electric motor and/or extruded aluminum steps. These features simplify construction of the step apparatus and make it more reliable than conventional motorized steps.

39 Claims, 9 Drawing Sheets

(56) References Cited

OTHER PUBLICATIONS

Kwikee Owner's Manual #842A, 42 Series Step, Oct. 2005 (12 pp.).
Kwikee Power Gear, Removal and Replacement of the Step Motor, Mar. 2012 (2 pp.).
Kwikee Power Gear Advance Actuation Solutions, Jan. 2012 (22 pp.).
Kwikee Product Improvement Bulletin, Electric Step Improvements, Jul. 2005 (1 p.).
Kwikee Product Service Training, 2005 (75 pp.).
Kwikee Owner's Manual #880, Electric Steps, Sep. 2002 (12 pp.).
Kwikee Owner's Manual #875, Electric Steps, Jul. 2000 (16 pp.).
Lippert Components, Inc., Coach Step, Installation, Operation and Service Manual (Jun. 18, 2008) (4 pp.).

* cited by examiner

MOTORIZED RETRACTABLE STEP APPARATUS

BACKGROUND

Retractable steps have been used in connection with recreation vehicles and other types of vehicles for many years to make it easier to enter and exit the vehicle. They are especially useful when the vehicle is positioned relatively high above the ground. The step allows users to easily traverse the distance from the ground to the interior of the vehicle.

Motorized retractable steps have a motor that extends and retracts the steps. The motor can automatically deploy the steps when the door to the vehicle is opened and automatically retract the steps when the door to the vehicle is closed or the vehicle's ignition is on.

Conventional motorized steps have a history of being unreliable and prone to breaking. This is largely due to the unduly complicated mechanisms use to drive movement of the steps. They were designed this way in an attempt to make them better able to withstand the rigors of repeated use over a period of years.

It would be desirable to provide a motorized retractable step that is much simpler and more reliable than conventional motorized steps.

SUMMARY

A number of representative embodiments are provided to illustrate the various features, characteristics, and advantages of the disclosed subject matter. The embodiments are provided in the context of the specific motorized retractable steps shown in the Figs. It should be understood, however, that many of the concepts may be used in a variety of other settings, situations, and configurations. For example, the features, characteristics, advantages, etc., of one embodiment can be used alone or in various combinations and subcombinations with one another.

A motorized retractable step apparatus includes a drive assembly where power is transferred directly from a motor assembly to a drive member that rotates to extend and retract one or more steps. This configuration eliminates much of the complexity associated with conventional motorized steps.

In one embodiment, the step apparatus includes a mounting base, a linkage assembly, a step coupled to the mounting base by way of the linkage assembly, a drive member coupled to the mounting base and attached to the linkage assembly, and an electric motor that drives rotation of the drive member. The motion transferred from the electric motor to the drive member can be entirely in the form of rotational motion without any linear motion.

In another embodiment, the step apparatus comprises a motor assembly including the electric motor and a gear set in a housing. The housing is attached to the electric motor and the gear set and housing are supplied as an integral unit with the electric motor. The gear set is used to set the gear ratio and torque output of the motor assembly. The gear set directly engages the drive member to power movement of the step.

In another embodiment, the step apparatus includes a brake that prevents the step from moving when the electric motor is off. The brake is preferably attached to the end of the electric motor that is opposite the housing and gear set. The brake can be electrically activated and it can engage the drive shaft of the electric motor to prevent it from moving.

In another embodiment, the step apparatus includes a step that is made of extruded aluminum. The step can be partially or, preferably, entirely made of aluminum. In one embodiment, the aluminum portion of the support is configured to support most or all of the weight on the step. In other words, the aluminum can form most or all of the structural components that support the weight on the step.

The Summary is provided to introduce a selection of concepts in a simplified form that are further described below in the Detailed Description. The Summary and the Background are not intended to identify key concepts or essential aspects of the disclosed subject matter, nor should they be used to constrict or limit the scope of the claims. For example, the scope of the claims should not be limited based on whether the recited subject matter includes any or all aspects noted in the Summary and/or addresses any of the issues noted in the Background.

DRAWINGS

The preferred and other embodiments are disclosed in association with the accompanying drawings in which.

DETAILED DESCRIPTION

Figure 1:
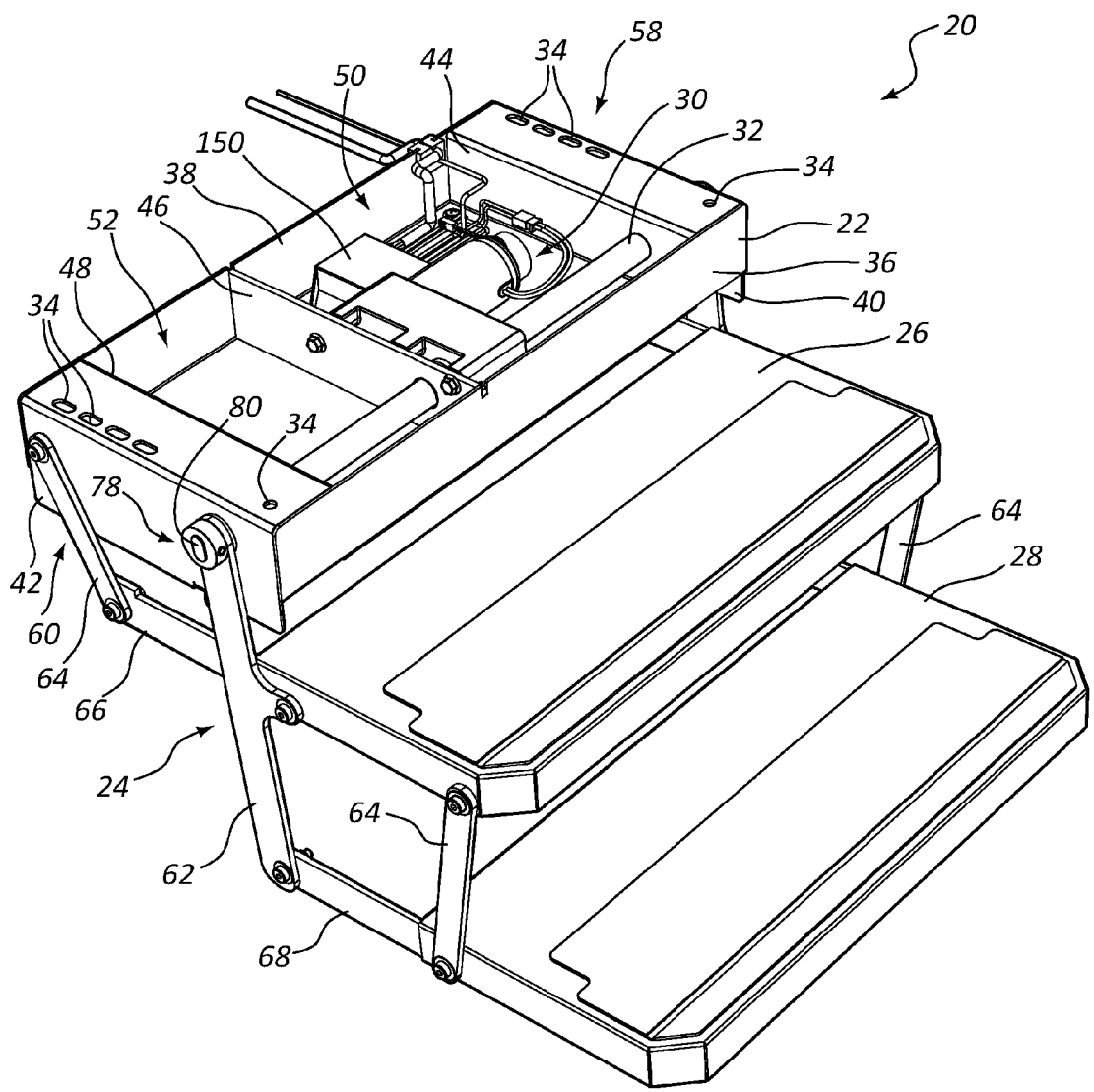
FIG. 1 is a top perspective view of one embodiment of a motorized retractable step apparatus in a deployed position.
Figure 2:
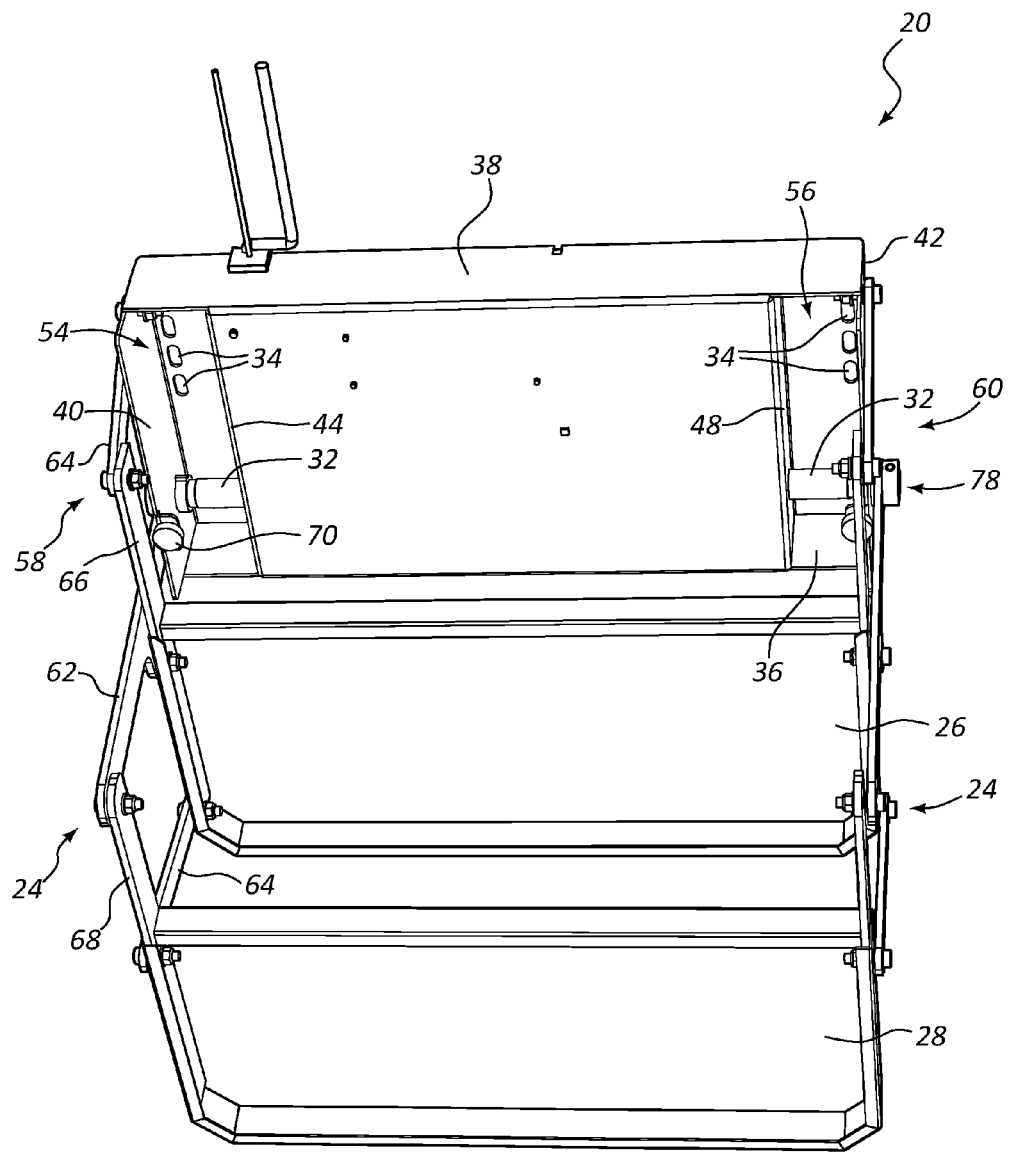
FIG. 2 is a bottom perspective view of the step apparatus in FIG. 1.

FIGS. 1-2 show top and bottom perspective views, respectively, of one embodiment of a motorized retractable step apparatus 20 (also referred to as a powered collapsible step, motorized collapsible step, powered foldable step, or motorized foldable step). The step apparatus 20 includes a mounting base 22 (also referred to as a stationary base), a linkage assembly 24, steps 26, 28 (alternatively referred to as first or upper step 26 and second or lower step 28). The step apparatus 20 also includes a motor assembly 30 operably coupled to a drive member 32.

It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The mounting base 22 has a generally rectangular shape formed by longitudinal sides 36, 38 (alternatively referred to a sidewalls or first side and second side) and transverse sides 40, 42 (alternatively referred to as sidewalls or third side and fourth side). The longitudinal sides 36, 38 are spaced apart from and extend parallel to each other in a longitudinal or lengthwise direction of the step apparatus 20. The transverse sides 40, 42 are spaced apart from and extend parallel to each other in a transverse or crosswise direction of the step apparatus 20.

The mounting base 22 also includes cross members 44, 46, 48 (alternatively referred to as brace members) that extend between the longitudinal sides 36, 38 in a direction that is parallel to the transverse sides 40, 42. The cross members 44 are spaced apart from each other and together with the longitudinal sides 36, 38 form two compartments 50, 52 in the mounting base 22 that are open in an upward direction and two compartments 54, 56 that are open in a downward direction. Each compartment includes a solid floor. The compartments 54, 56 are positioned adjacent to a first end 58 and a second end 60 of the mounting base 22, respectively.

The mounting base 22 is configured to be coupled to a vehicle. In one embodiment, the mounting base 22 is configured to be coupled to the underside of the vehicle. The mounting base 22 includes a plurality of holes 34 in the tops of the compartments 54, 56 that are configured to receive fasteners that extend upward through the holes 34 into the vehicle. The compartments 54, 56 provide access to the holes 34 from the underside of the step apparatus 20. Suitable fasteners include screws, bolts, and the like. It should be appreciated that the step apparatus 20 can be coupled to the vehicle in any configuration and using any suitable coupling technique—e.g., welding, adhesives, and the like.

The mounting base 22 can be made of any suitable material such as metal (e.g., steel), plastic, or composites. In one embodiment, the mounting base 22 is made primarily or entirely of steel that has been painted or otherwise treated to make it weather resistant. In another embodiment, the mounting base 22 is formed by bending, punching, cutting, welding, the steel to create the shape shown in FIGS. 1-2.

In most situations, the step apparatus 20 is coupled to the vehicle below a door or other entry point. For example, the step apparatus 20 is coupled below a door to a motor home. It should be appreciated, however, that the step apparatus 20 can be coupled to any suitable location on the vehicle including areas where a door is not present.

In one embodiment, the step apparatus 20 is coupled to a recreational vehicle such as a motorhome, travel trailer, fifth wheel trailer, and the like. In another embodiment, the step apparatus 20 is coupled to other vehicles such as buses, trains, and the like.

Figure 3:
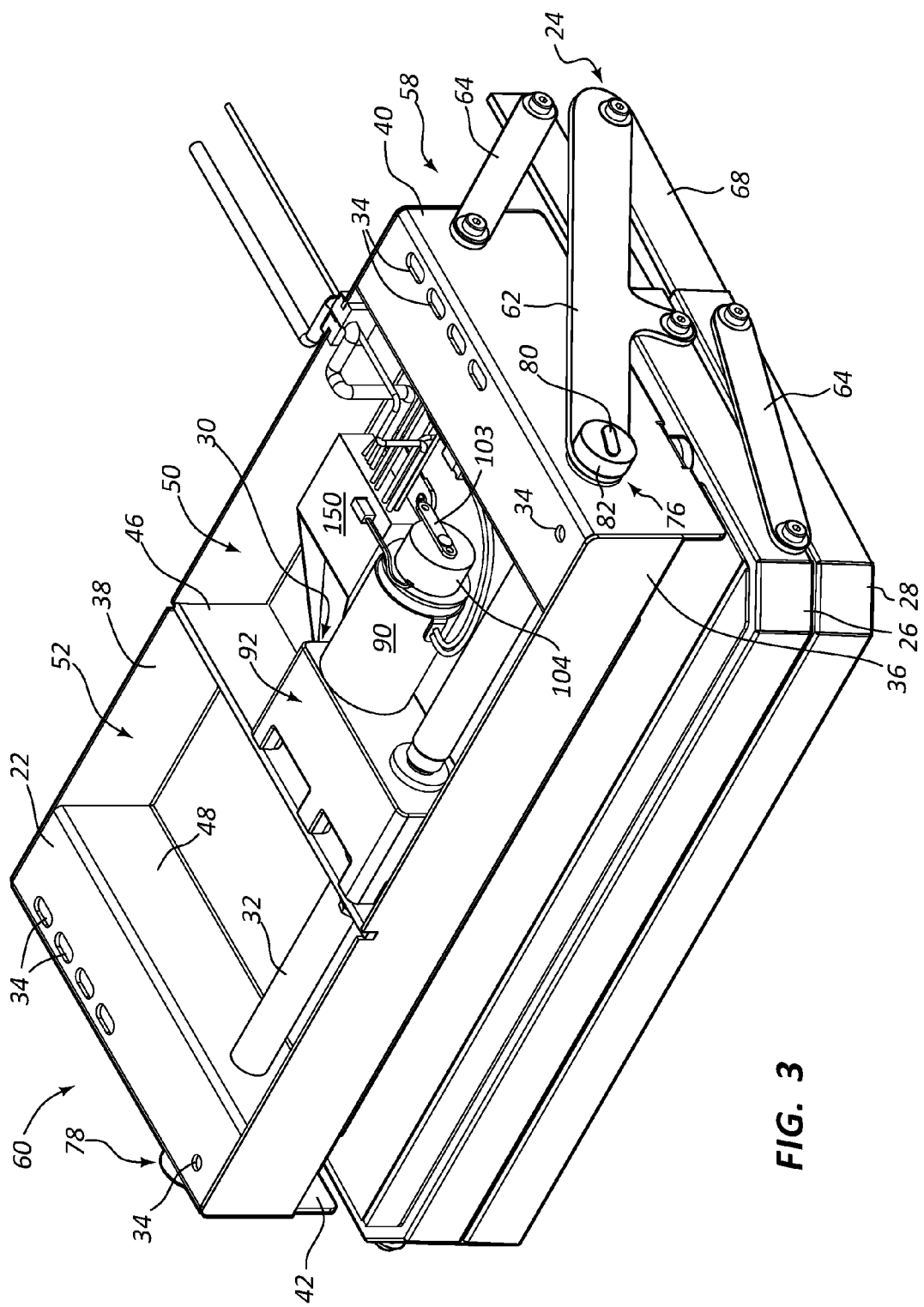
FIG. 3 is a top perspective view of the step apparatus in FIG. 1 in a retracted position.

The steps 26, 28 are coupled to the mounting base 22 by the linkage assembly 24 that allows the steps 26, 28 to move between an extended or deployed position (FIGS. 1-2) and a collapsed or retracted position (FIG. 3). The linkage assembly 24 includes a first set of linkages coupled to the first end 58 of the mounting base 22 and a second set of linkages coupled to the second end 60 of the mounting base 22. The sets of linkages include the same components and are configured similarly.

Each set of linkages include a drive linkage 62 and two auxiliary linkages 64. The drive linkages 62 are fixed to opposite ends of the drive member 32 so that the drive member 32 and the drive linkages 62 rotate in unison. The drive linkages 62 are also coupled to arms 66, 68 that extend outward from the rear of the steps 26, 28, respectively.

The auxiliary linkages 64 are coupled to the arms 66, 68 of adjacent steps 26, 28, or if the step is the uppermost step 26, to the mounting base 22 and the arm 66 of the uppermost step 26. The linkages 62, 64 control movement of the steps 26, 28 as they are retracted or deployed. The position of the linkages 62, 64 causes the steps 26, 28 to fold under the mounting base 22 when the steps 26, 28 are retracted and deploy outward when the steps 26, 28 are extended.

The movement of the linkage assembly 24 and steps 26, 28 is similar to that of a scissors type motion. The linkages 62, 64 and the arms 66, 68 expand when the steps 26, 28 are deployed and contract when the steps 26, 28 are retracted. The steps 66, 68 remain roughly parallel to each other as they move between the deployed position and the retracted position. It should be appreciated that the steps 26, 28 can be deployed and retracted using any suitable mechanism.

The steps 26, 28 can include a non-skid material on their top surfaces. The non-skid material can be integrally formed with the top surface of the steps 26, 28 or can a separate component applied after the steps 26, 28 have been formed. An example of the former is a raised pattern formed in the top surface of the steps 26, 28. An example of the latter is non-skid material attached to the top surface of the steps 26, 28 with adhesive.

In one embodiment, the step 26 contacts stops 70 when in the retracted position. The stops 70 prevent the steps 26, 28 from shaking or otherwise moving when the vehicle is in motion. The stops 70 can be formed of any material such as plastic, metal, or composites. In one embodiment, the stops 70 include an elastomeric material that contacts the top surface of the step 26.

It should be appreciated that the step apparatus 20 can include any number of steps 26, 28 depending on the distance that needs to be traversed—e.g., the distance from the door of the vehicle to the ground. In one embodiment, the step apparatus 20 includes a single step 26. In another embodiment, the step apparatus 20 includes three or more steps.

Figure 4:
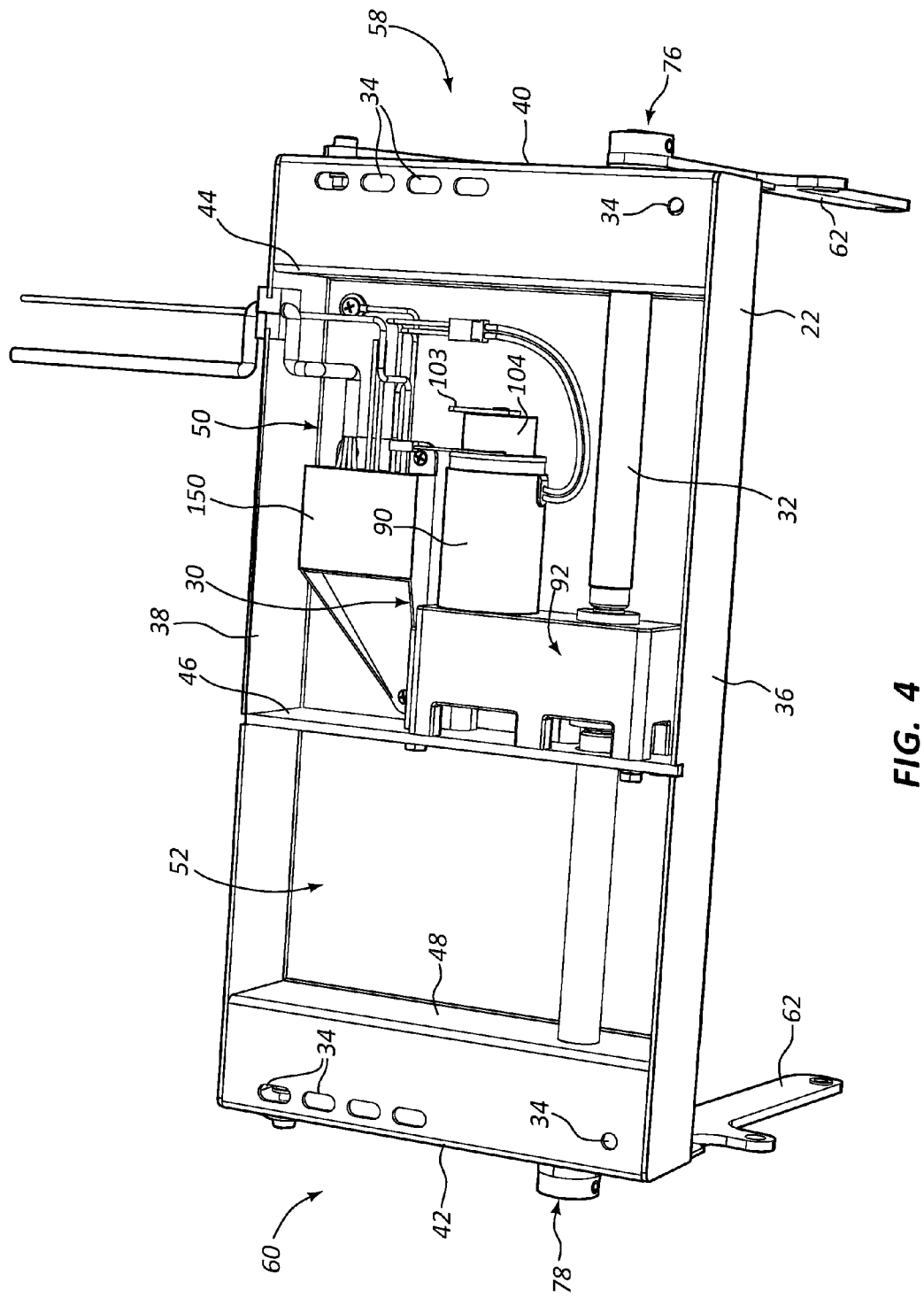
FIG. 4 is a top perspective view of the step apparatus in FIG. 1 with the steps removed.
Figure 5:
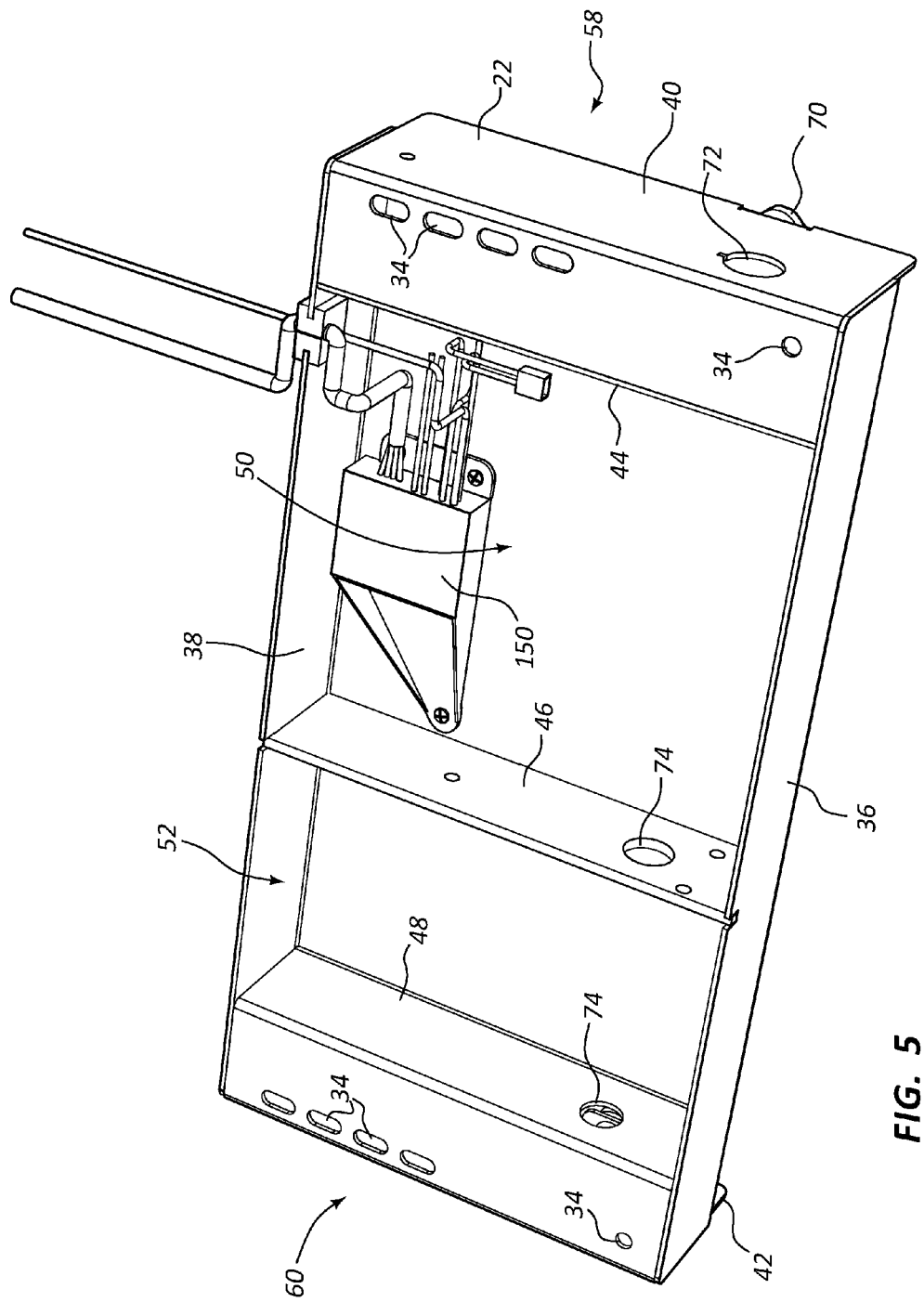
FIG. 5 is a top perspective view of a mounting base from the step apparatus in FIG. 1.
Figure 6:
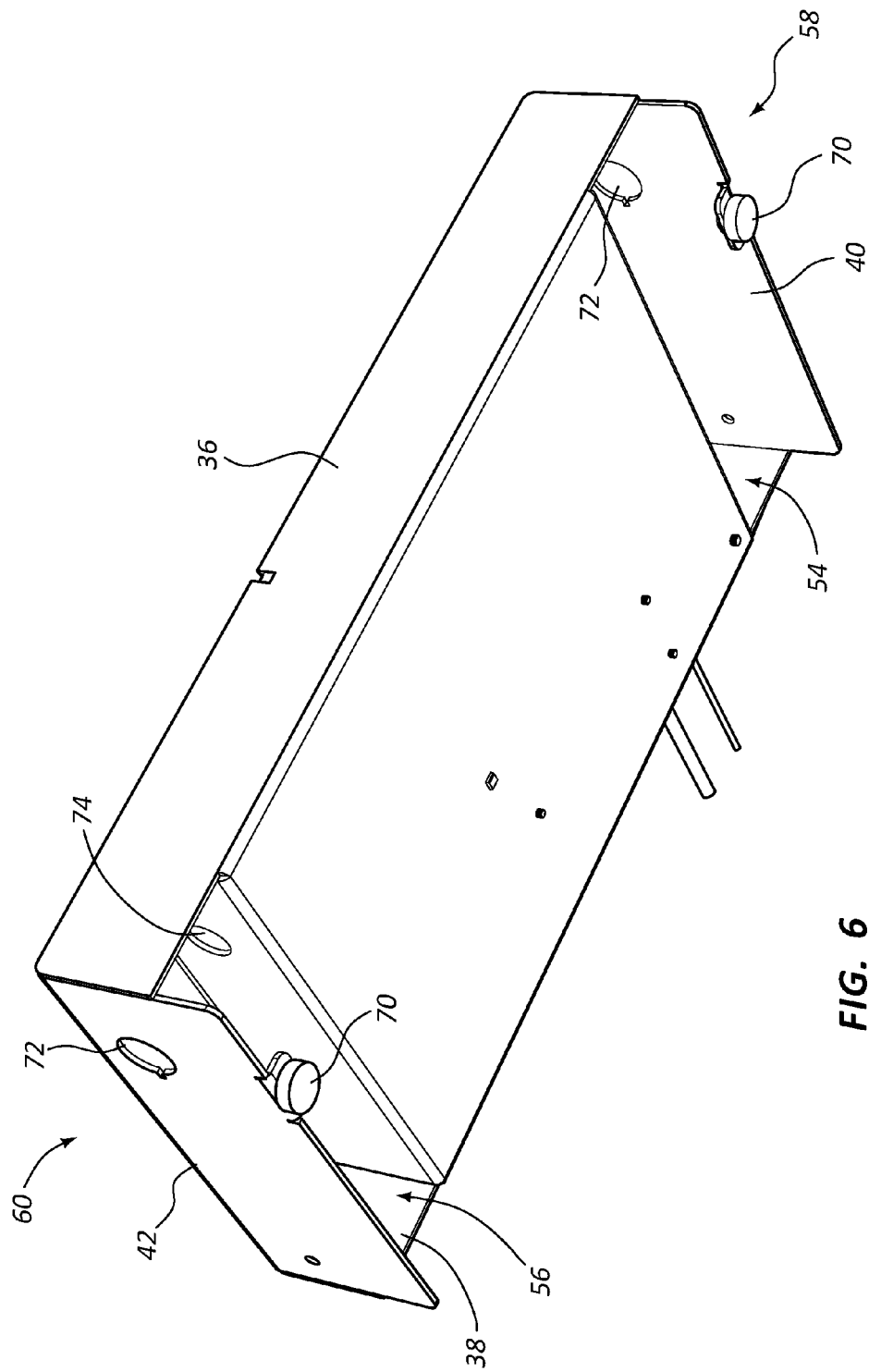
FIG. 6 is a bottom perspective view of the mounting base in FIG. 5.

Referring to FIG. 4, the configuration of the motor assembly 30 and drive member 32 is described in greater detail. The drive member 32 extends the length of the mounting base 22 adjacent to the longitudinal side 36. The drive member 32 passes through holes 74 in the cross members 44, 46, 48, respectively (FIGS. 5-6) without contacting the cross members 44, 46, 48. Alternatively, the drive member 32 can pass through bearings or bushings positioned in the holes 74.

The ends 76, 78 of the drive member 32 extend through holes 72 in the transverse sides 40, 42 of the mounting base 22. The ends 76, 78 are supported by bearings, bushings, or the like which are positioned in the holes 72. The ends 76, 78 are coupled to the drive linkages 62.

Figure 7:
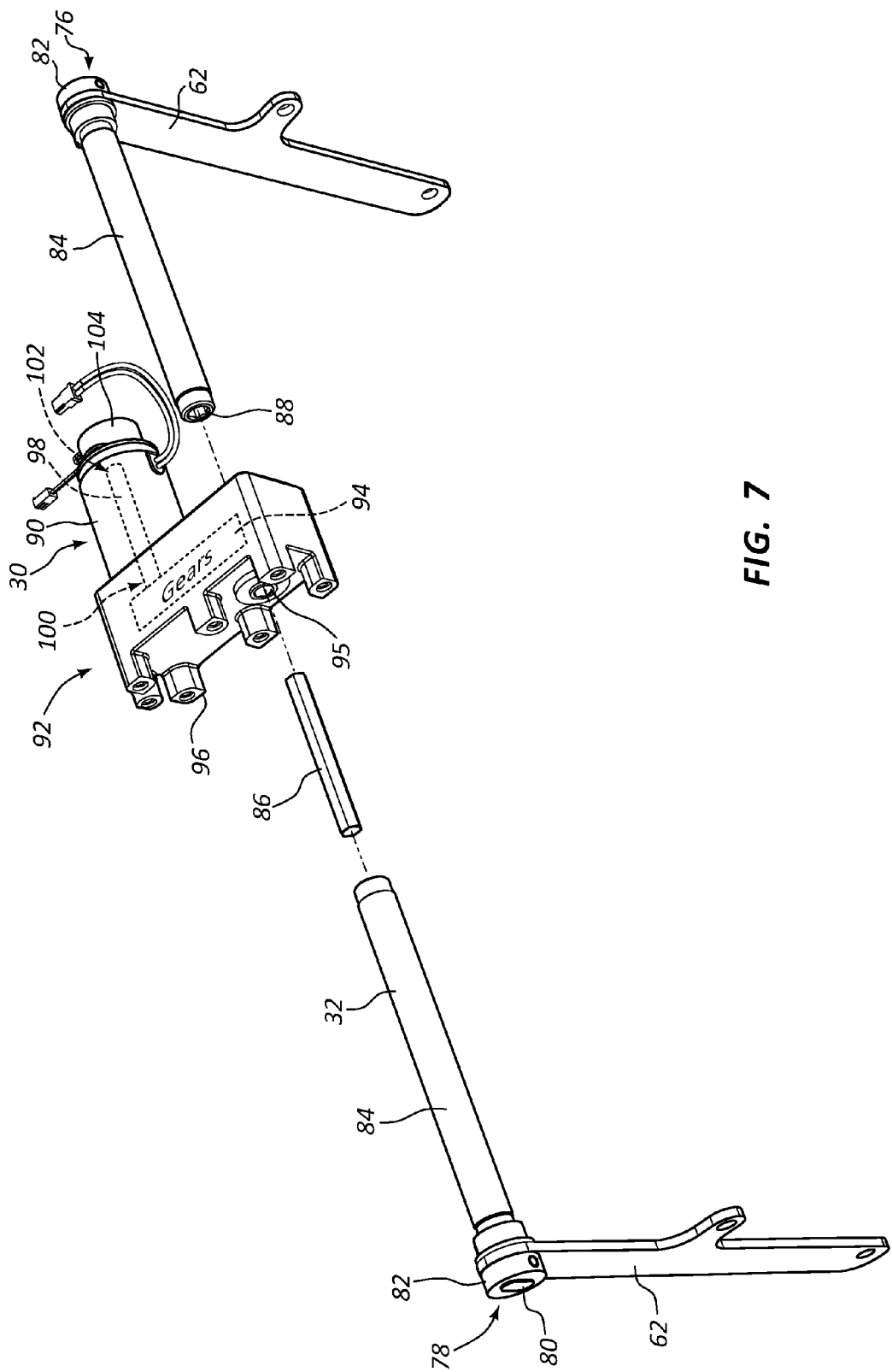
FIG. 7 is an exploded perspective view of a drivetrain from the step apparatus in FIG. 1.

FIG. 7 shows an exploded view of the drive member 32. The drive member 32 includes main drive shafts 84 (alternatively referred to as first and second drive shafts) and an intermediate drive shaft 86. The intermediate drive shaft 86 engages the motor assembly 30. The main drive shafts 84 extend outward from the intermediate drive shaft 86 in opposite directions to the ends 76, 78 of the mounting base 22.

The intermediate drive shaft 86 has a hexagonal shape that corresponds to hexagonal shaped openings 88 in the interior ends of the main drive shafts 84. The ends of the intermediate drive shaft 86 engage the openings 88 in the main drive shafts 84. It should be appreciated that the drive shafts 84, 86 can engage each other in any suitable manner or, alternatively, the drive member 32 can be a single integral unit.

In one embodiment, the main drive shafts 84 are interchangeable with each other. The motor assembly 30 is positioned in the middle of the mounting base 22 so that the main drive shafts 84 are the same length. Making the main drive shafts 84 the same makes it easier to manufacture and manage the inventory for the step apparatus 20.

The drive linkages 62 can be coupled to the drive member 32 in the following manner. Each drive linkage 62 includes a hole shaped to correspond to the outer end 80 of the drive shafts 84. The holes in the drive linkages 62 and the ends 80 are shaped in a manner that prevents the drive linkages 62 from rotating relative to the drive member 32. For example, the ends 80 and the holes in the drive linkages 62 can have an oblong shape as shown in the Figs. In other embodiments, the holes in the drive linkages 62 and the ends 80 can have other corresponding shapes such as square, hexagonal, star, and the like. The drive linkages 62 are held in place on the drive shafts 84 by couplers 82 that slide over the ends 80 and are held in place by a set screw or other fastener.

The motor assembly 30 includes an electric motor 90 and a gear set 92. The gear set 92 includes a plurality of gears 94 enclosed in a housing 96. The gear set 92 is used to set the gear ratio and torque output of the motor assembly 30. The electric motor 90 includes a drive shaft 98 that spins at a high rate of speed. The gear set 92 is provided to reduce the speed from the drive shaft 98 to a speed that is more suitable given the circumstances. In one embodiment, the electric motor 90 and the gear set 92 are supplied as an integral unit. Examples of such motor assemblies 30 can be obtained from Fohon Industry, China.

The gear set 92 also includes an output drive component 95 where power or motion is output from the gear set 92. The output drive component 95 rotates at a much lower speed than the drive shaft 98 of the electric motor 90. Unlike the rest of the gears 94, the output drive component 95 can be accessed through the housing 96. In one embodiment, the output drive component 95 is a drive sleeve configured to receive the intermediate drive shaft 86. It should be appreciated that the output drive component 95 can take numerous other forms such as a drive gear, drive shaft, etc.

The drive shaft 98 extends lengthwise through the electric motor 90 and includes a first end 100 that extends through the housing 96 and engages the plurality of gears 94 and a second end 102 coupled to a brake 104.

The motor assembly 30 and the drive member 32 can be referred to as having a direct drive configuration meaning that the motion of the output drive component 95 is transferred directly to rotary motion of the drive member 32. There are no complicated arrangements such as the one shown in U.S. Pat. No. 5,957,237 where rotary motion from the motor is transformed partly into linear motion using a rotating disk and reciprocating arm. The motion transferred from the electric motor 90 to the drive member 32 is entirely in the form of rotational motion and does not include any linear motion.

In one embodiment, the direction of power transmission between the electric motor 90 and the drive member 32 is reversible regardless of the position of the steps 26, 28. The drive member 32 can rotate and motion is transferred back through the gear set 92 to the electric motor 90 when the steps 26, 28 are in the deployed position, retracted position, or any position in between.

Some gear arrangements, such as those using a worm drive or the configuration shown in U.S. Pat. No. 5,957,237, do not have a reversible direction of power transmission through the entire range of motion of the steps. These type of drives are sometimes referred to as self-locking. Although this can help prevent the steps from moving when in the deployed position, it can also be problematic when the user wants to retract the steps manually. For example, the user cannot extend and/or retract the steps when the vehicle has lost power due to a short or a drained battery or when the motor fails.

In one embodiment, the step apparatus 20 and, specifically the gear set 92 are not self-locking and do not include a worm drive. It should be appreciated that in other embodiments, the step apparatus 20 can be self-locking and include a worm drive.

Referring to FIGS. 1 and 3, the drive member 32 is configured to rotate less than 360° and even less than 180° as the steps 26, 28 move between the retracted position and the deployed position. Typically, the drive member 32 rotates approximately 90° as the steps 26, 28 move between the retracted position and the deployed position.

The small amount of rotation required by the drive member 32 may make it desirable to further reduce the speed at which the steps 26, 28 move between the retracted position and the deployed position. In one embodiment, this is done by lowering the speed of the output drive component 95 by decreasing the power provided to the electric motor 90. For example, the current supplied to the electric motor 90 can be reduced to lower the speed of the output component 95 and consequently lower the speed at which the steps 26, 28 move between the retracted position and the deployed position.

The electric motor 90 can be shut off using a circuit breaker when the steps 26, 28 reach the retracted position or the deployed position. The current draw by the electric motor 90 spikes when the steps 26, 28 reach their limits of movement thereby tripping the circuit breaker. It should be appreciated that other methods can be used to stop the electric motor 90 when the steps 26, 28 reach the retracted position or the deployed position. For example, sensors can be used to detect when the steps 26, 28 reach the desired position. A control system then shuts off the electric motor 90.

The brake 104 is coupled to the electric motor 90 opposite the gear set 92 and housing 96. The brake 104 can be coupled to the electric 90 using any suitable technique. In one embodiment, the brake 104 is coupled to the electric motor with fasteners such as screws, bolts, and the like. In other embodiments, the brake 104 can be coupled to the electric motor 90 with adhesive, welding, and the like. Also, the brake 104 and the electric motor 90 could be supplied as an integral unit.

The brake 104 can be electrically actuated to control when the brake is engaged and disengaged. In one embodiment, the brake 104 is configured to be engaged when the electric motor 90 is off and disengaged when the electric motor 90 is on. Thus, the brake 104 prevents the steps 26, 28 from moving when the electric motor 90 is off and allows the steps 26, 28 to move when the electric motor 90 is on. The brake 104 is configured so that electrical power applied to the brake 104 causes it to release. The brake 104 is engaged when electrical power is not supplied to the brake 104, which is the default position for the brake 104.

The brake 104 can also include a manual override 103, which is in the form of a lever. The brake 104 can be disengaged by moving the manual override 103 to allow the steps 26, 28 to move without providing power to the brake 104. This may be useful in situations where power is unavailable.

The second end 102 of the drive shaft 98 is accessible through the housing of the electric motor 90. The brake 104 engages the drive shaft 98 and prevents it from rotating. This prevents the remaining drive components from rotating thereby holding the steps 26, 28 in a fixed position. In one embodiment, the brake 104 includes a drive member that engages the drive shaft 98 so that the drive member and the drive shaft 98 rotate together.

Figure 8:
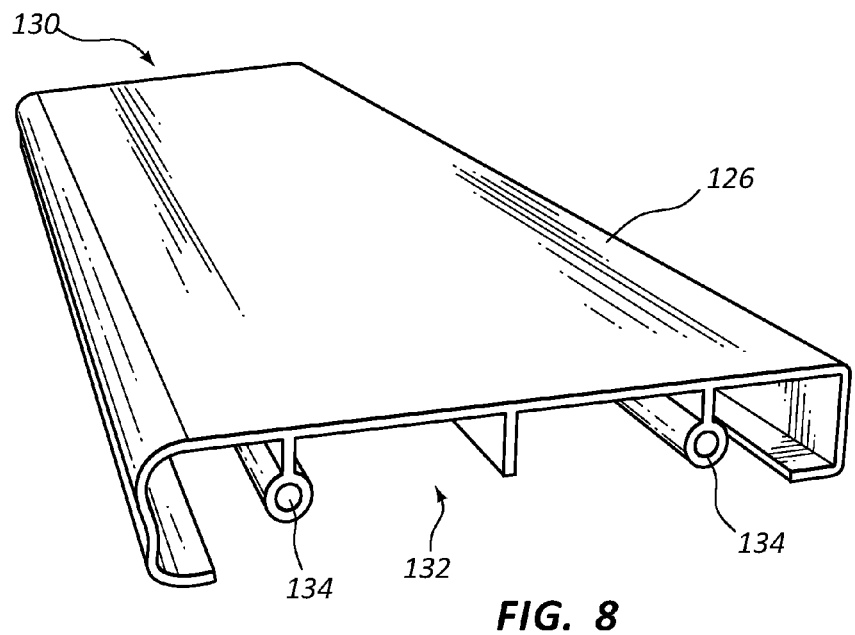
FIG. 8 is a top perspective view of one embodiment of a step that can be used with the step apparatus in FIG. 1.
Figure 9:
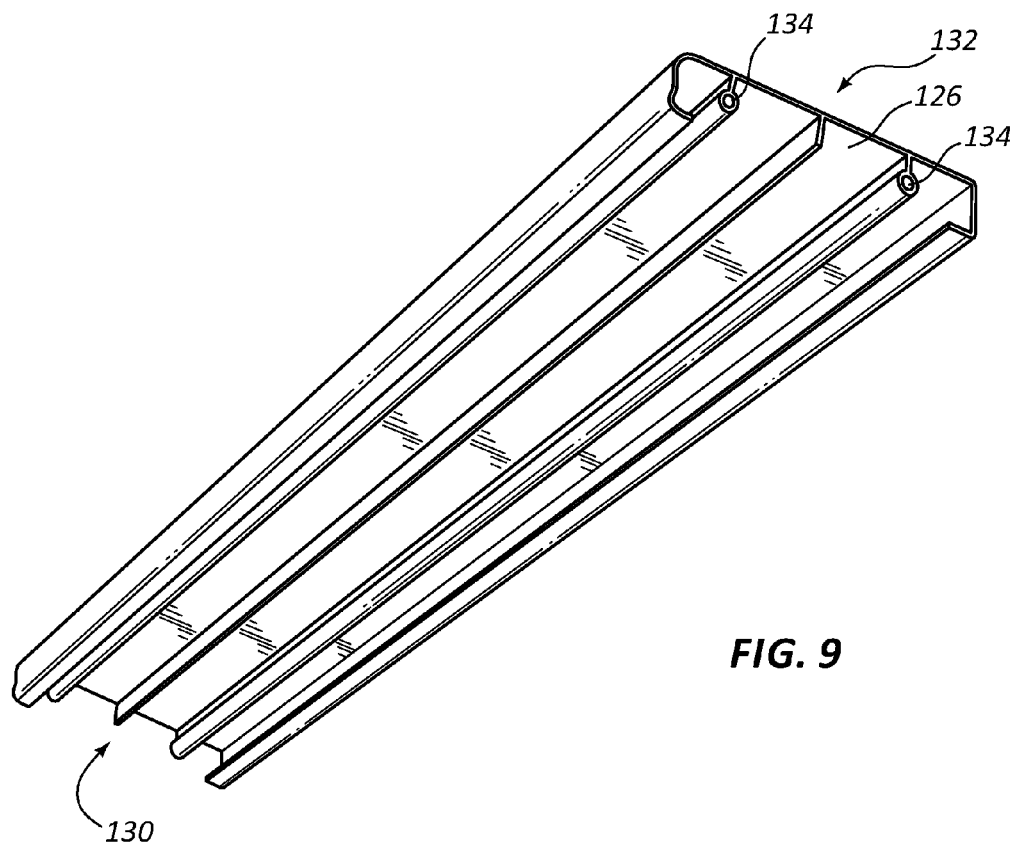
FIG. 9 is a bottom perspective view of the step in FIG. 8.
Figure 10:
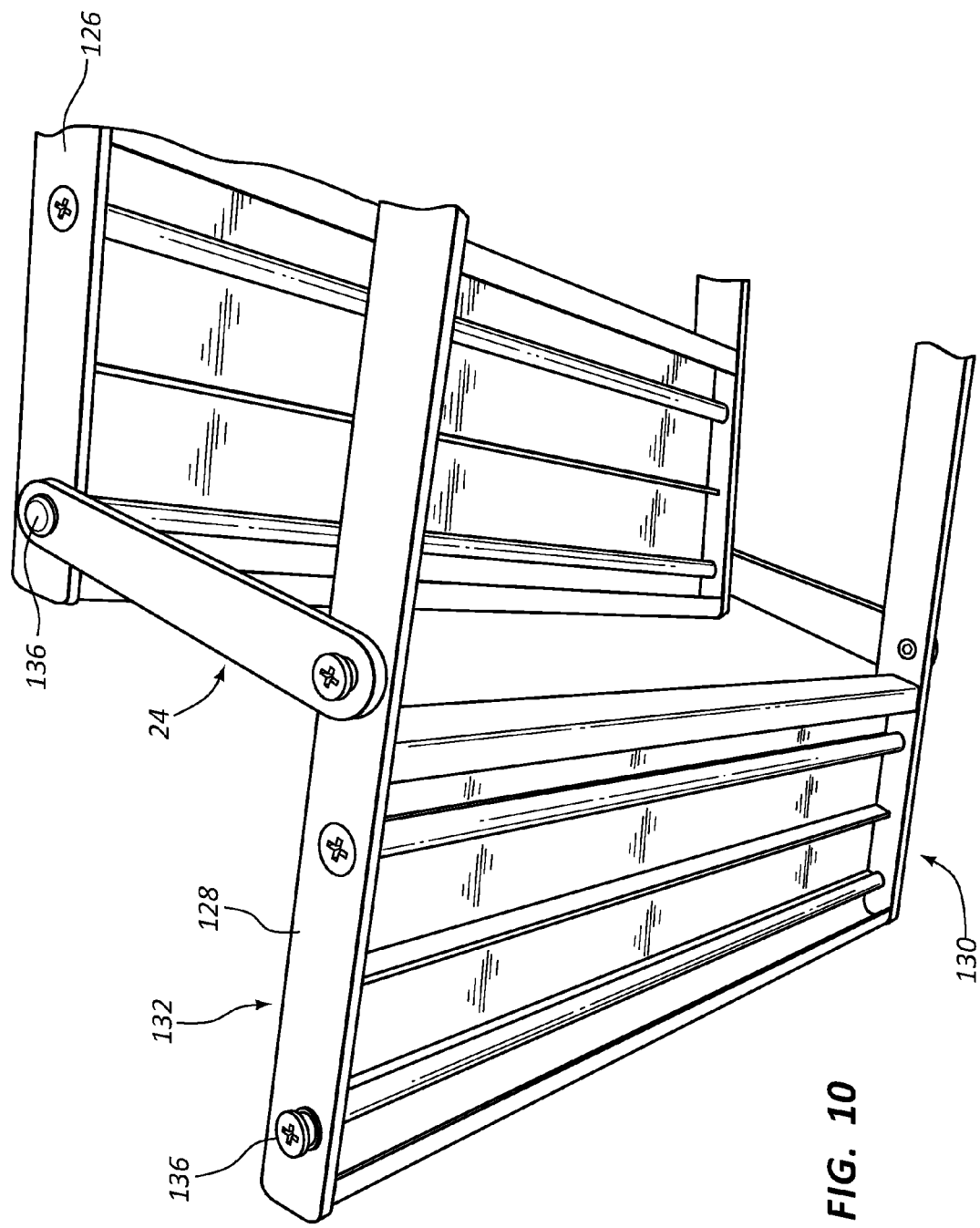
FIG. 10 is a bottom perspective view of the step portion of the step apparatus in FIG. 1 including the steps in FIG. 8.

FIGS. 8-10 show an alternative embodiment of steps 126, 128 that can be used with the step apparatus 20. The steps 126, 128 differ from standard metal steps in that the steps 126, 128 are made of a single piece of extruded aluminum. The aluminum can be extruded and cut to the desired length and coupled to the linkage assembly 24 in the manner shown in FIG. 10.

The steps 126, 128 each include opposite sides 130, 132 (alternatively referred to as first and second sides) having holes 134 formed as the aluminum is extruded. The holes 134 receive fasteners 136 that extend through the linkage assembly 24. It should be appreciated that the steps 126, 128 can be coupled to the linkage assembly 24 using any suitable technique or method.

The steps 126, 128 can also include ridges or ribs 138 that strengthen the steps 126, 128. It should also be appreciated that the steps 126, 128 can have any of the other features and configurations mentioned above in connection with the steps 26, 28.

The step apparatus also includes a control system 150. The control system 150 can be used to automate the steps of deploying and retracting the steps 26, 28. For example, the control system can include a door sensor that is capable of determining when a door is open or closed. If the door is open, the steps 26, 28 are automatically deployed and if the door is closed, the steps 26, 28 are automatically retracted. Also, the control system 150 can retract the steps 26, 28 if the ignition switch is moved to the on position.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure the term shall mean," etc.).

References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope.

The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be given their broadest interpretation in view of the prior art and the meaning of the claim terms.

As used herein, spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

All ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A step apparatus comprising:
   a mounting base including a first end and a second end positioned opposite the first end;
   a linkage assembly;
   a step coupled to the mounting base by way of the linkage assembly, the step being movable between a retracted position where the step is positioned adjacent to the mounting base and a deployed position where the step is positioned outward from the mounting base;
   a drive member coupled to the mounting base and attached to the linkage assembly at the first end and the second end of the mounting base, wherein rotation of the drive member moves the step between the retracted position and the deployed position; and
   an electric motor coupled to the mounting base, the electric motor being configured to drive rotation of the drive member;
   wherein the step is configured to move from the deployed position to the retracted position by manually rotating the drive member.

2. The step apparatus of claim 1 wherein motion transferred from the electric motor to the drive member is entirely in the form of rotational motion and does not include any linear motion.

3. The step apparatus of claim 1 comprising a plurality of steps coupled to the mounting base by way of the linkage assembly.

4. The step apparatus of claim 1 wherein the drive member includes a first drive shaft and a second drive shaft coupled together.

5. The step apparatus of claim 1 wherein motion is transferred from the electric motor to a gear set and then from the gear set to the drive member.

6. The step apparatus of claim 5 wherein the gear set includes a plurality of gears enclosed in a housing and an output drive component that is accessible through the housing, and wherein the drive member engages the output drive component.

7. The step apparatus of claim 6 wherein the output drive component includes a drive sleeve and the drive member engages the drive sleeve.

8. The step apparatus of claim 1 comprising a brake attached to the electric motor, the brake being configured to prevent the step from moving when the electric motor is off.

9. The step apparatus of claim 1 wherein the step is made of extruded aluminum.

10. A step apparatus comprising:
a mounting base;
a step coupled to the mounting base, the step being movable between a retracted position where the step is positioned adjacent to the mounting base and a deployed position where the step is positioned outward from the mounting base;
an electric motor coupled to the mounting base, the electric motor being configured to drive movement of the step between the retracted position and the deployed position; and
a brake attached to the electric motor, the brake being configured to prevent the step from moving when the electric motor is off.

11. The step apparatus of claim 10 wherein the brake is electrically activated.

12. The step apparatus of claim 10 wherein the brake engages a drive shaft of the electric motor and prevents the drive shaft from rotating.

13. The step apparatus of claim 10 wherein the electric motor includes a drive shaft having a first end and a second end positioned opposite the first end and wherein motion is transferred from the first end to the step and the brake is coupled to the second end.

14. A step apparatus comprising:
a mounting base including a first end and a second end positioned opposite the first end;
a linkage assembly;
a step coupled to the mounting base by way of the linkage assembly, the step being movable between a retracted position where the step is positioned adjacent to the mounting base and a deployed position where the step is positioned outward from the mounting base;
a drive member coupled to the mounting base and attached to the linkage assembly at the first end and the second end of the mounting base, wherein rotation of the drive member moves the step between the retracted position and the deployed position; and
a motor assembly including an electric motor attached to a gear set, the gear set including a plurality of gears that set the gear ratio and torque output of the motor assembly;
wherein the drive member directly engages the gear set and the gear set does not include a worm drive.

15. The step apparatus of claim 14 wherein the gear set includes a housing enclosing the plurality of gears and an output drive component that extends out of the housing, and wherein the drive member engages the output drive component.

16. The step apparatus of claim 14 wherein the gear set includes a drive sleeve and the drive member extends through the drive sleeve.

17. The step apparatus of claim 14 wherein motion transferred from the electric motor to the drive member is entirely in the form of rotational motion and does not include any linear motion.

18. The step apparatus of claim 14 wherein the motor assembly includes a brake attached to the electric motor, the brake being configured to prevent the step from moving when the electric motor is off.

19. A step apparatus comprising:
a mounting base;
a linkage assembly;
a step coupled to the mounting base by way of the linkage assembly, the step being movable between a retracted position where the step is positioned adjacent to the mounting base and a deployed position where the step is positioned outward from the mounting base; and
an electric motor coupled to the mounting base, the electric motor being configured to drive movement of the step between the retracted position and the deployed position;
wherein the step is made of extruded aluminum; and
wherein the step includes a first side and a second side located on opposite ends of the step, wherein each one of the first side and the second side includes a hole formed when the aluminum was extruded, and wherein the linkage assembly is attached to the first side and the second side of the step with fasteners that engage the holes.

20. The step apparatus of claim 19 wherein the mounting base includes a first end and a second end positioned opposite the first end, the step apparatus comprising:
a drive member coupled to the mounting base and attached to the linkage assembly at the first end and the second end of the mounting base, wherein rotation of the drive member moves the step between the retracted position and the deployed position;
wherein the electric motor is configured to drive rotation of the drive member.

21. The step apparatus of claim 20 wherein motion transferred from the electric motor to the drive member is entirely in the form of rotational motion and does not include any linear motion.

22. The step apparatus of claim 20 wherein the step is configured to move from the deployed position to the retracted position by manually rotating the drive member.

23. The step apparatus of claim 20 wherein the drive member includes a first drive shaft and a second drive shaft coupled together.

24. The step apparatus of claim 20 wherein motion is transferred from the electric motor to a gear set and then from the gear set to the drive member.

25. The step apparatus of claim 24 wherein the gear set includes a plurality of gears enclosed in a housing and an output drive component that is accessible through the housing, and wherein the drive member engages the output drive component.

26. The step apparatus of claim 20 comprising a motor assembly including the electric motor and a gear set attached to the electric motor, the gear set including a plurality of gears that set the gear ratio and torque output of the motor assembly, wherein the drive member directly engages the gear set and the gear set does not include a worm drive.

27. The step apparatus of claim 19 comprising a brake attached to the electric motor, the brake being configured to prevent the step from moving when the electric motor is off.

28. The step apparatus of claim 27 wherein the brake is electrically activated.

29. The step apparatus of claim 27 wherein the brake engages a drive shaft of the electric motor and prevents the drive shaft from rotating.

30. The step apparatus of claim 27 wherein the electric motor includes a drive shaft having a first end and a second end positioned opposite the first end and wherein motion is transferred from the first end to the step and the brake is coupled to the second end.

31. The step apparatus of claim 19 comprising a plurality of steps coupled to the mounting base by way of the linkage assembly, wherein each of the plurality of steps is made of extruded aluminum and moves between the retracted position and the extended position, and wherein each of the plurality of steps includes a first side and a second side located on opposite ends of the step where each one of the first side and the second side includes a hole formed when the aluminum was extruded, and wherein the linkage assembly is attached to the first side and the second side of each of the plurality of steps with fasteners that engage the holes.

32. The step apparatus of claim 1 comprising a motor assembly including the electric motor and a gear set attached to the electric motor, the gear set including a plurality of gears that set the gear ratio and torque output of the motor assembly, wherein the drive member directly engages the gear set and the gear set does not include a worm drive.

33. The step apparatus of claim 10 wherein the mounting base includes a first end and a second end positioned opposite the first end, the step apparatus comprising:
  a drive member coupled to the mounting base and attached to the linkage assembly at the first end and the second end of the mounting base, wherein rotation of the drive member moves the step between the retracted position and the deployed position;
  wherein the electric motor is configured to drive rotation of the drive member.

34. The step apparatus of claim 33 wherein motion transferred from the electric motor to the drive member is entirely in the form of rotational motion and does not include any linear motion.

35. The step apparatus of claim 33 wherein the drive member includes a first drive shaft and a second drive shaft coupled together.

36. The step apparatus of claim 33 wherein motion is transferred from the electric motor to a gear set and then from the gear set to the drive member.

37. The step apparatus of claim 36 wherein the gear set includes a plurality of gears enclosed in a housing and an output drive component that is accessible through the housing, and wherein the drive member engages the output drive component.

38. The step apparatus of claim 10 wherein the step is made of extruded aluminum.

39. The step apparatus of claim 14 wherein the step is made of extruded aluminum.

\* \* \* \* \*